United States Patent
Farre Guiu et al.

(10) Patent No.: US 11,711,363 B2
(45) Date of Patent: Jul. 25, 2023

(54) SYSTEMS FOR AUTHENTICATING DIGITAL CONTENTS

(71) Applicant: Disney Enterprises, Inc., Burbank, CA (US)

(72) Inventors: Miquel Angel Farre Guiu, Bern (CH); Edward C. Drake, Stevenson Ranch, CA (US); Anthony M. Accardo, Los Angeles, CA (US); Mark Arana, Agoura Hills, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 17/860,910

(22) Filed: Jul. 8, 2022

(65) Prior Publication Data

US 2022/0345455 A1 Oct. 27, 2022

Related U.S. Application Data

(62) Division of application No. 16/788,181, filed on Feb. 11, 2020, now Pat. No. 11,425,120.

(51) Int. Cl.
| | |
|---|---|
| *H04L 9/40* | (2022.01) |
| *G06F 16/435* | (2019.01) |
| *G06F 16/9535* | (2019.01) |
| *G10L 17/06* | (2013.01) |
| *G10L 17/00* | (2013.01) |
| *G06V 40/16* | (2022.01) |

(52) U.S. Cl.
CPC ........ *H04L 63/0861* (2013.01); *G06F 16/436* (2019.01); *G06F 16/9535* (2019.01); *G06V 40/171* (2022.01); *G06V 40/172* (2022.01); *G10L 17/00* (2013.01); *G10L 17/06* (2013.01)

(58) Field of Classification Search
CPC ............... H04L 63/0861; G06F 16/436; G06F 16/9535; G06V 40/171; G06V 40/172; G10L 17/00; G10L 17/06
USPC ........................................................ 704/275
See application file for complete search history.

(56) References Cited

U.S. PATENT DOCUMENTS

| | | | |
|---|---|---|---|
| 9,076,048 B2 * | 7/2015 | Shubinsky | ............... H04N 5/33 |
| 10,255,724 B2 * | 4/2019 | Barbaro Altieri | .. G06Q 30/0241 |
| 11,425,120 B2 * | 8/2022 | Farre Guiu | ............. G10L 17/00 |

* cited by examiner

*Primary Examiner* — Susan I McFadden
(74) *Attorney, Agent, or Firm* — Farjami & Farjami LLP

(57) ABSTRACT

A system for authenticating digital contents includes a computing platform having a hardware processor and a memory storing a software code. According to one implementation, the hardware processor executes the software code to receive digital content, identify an image of a person depicted in the digital content, determine an ear shape parameter of the person depicted in the image, determine another biometric parameter of the person depicted in the image, and calculate a ratio of the ear shape parameter of the person depicted in the image to the biometric parameter of the person depicted in the image. The hardware processor is also configured to execute the software code to perform a comparison of the calculated ratio with a predetermined value, and determine whether the person depicted in the image is an authentic depiction of the person based on the comparison of the calculated ratio with the predetermined value.

20 Claims, 6 Drawing Sheets

SYSTEMS FOR AUTHENTICATING DIGITAL CONTENTS

The present application is a Division of U.S. application Ser. No. 16/788,181, filed Feb. 11, 2020, which is hereby incorporated by reference in its entirety into the present application.

BACKGROUND

Advances in machine learning have enabled the production of realistic but forged recreations of a person's image or voice, known as "deepfakes" due to the use of deep artificial neural networks for their creation. Deepfakes may be produced without the consent of the person whose image or voice is being used, and may make the person being represented appear to say or do something that they have in fact not said or done. As a result, deepfake manipulated digital content can be used maliciously to spread misinformation.

Due to the widespread popularity of digital content for the distribution of entertainment and news, the effective authentication and management of that content is important to its creators, owners and distributors alike. However, as machine learning solutions continue to improve, deepfakes are and will continue to be difficult to detect. As a result, subtly manipulated or even entirely fake digital content may inadvertently be broadcast or otherwise distributed in violation of contractual agreement or regulatory restrictions, thereby subjecting the content owners and/or distributors to potential legal jeopardy.

SUMMARY

There are provided systems for authenticating digital contents, substantially as shown in and/or described in connection with at least one of the figures, and as set forth more completely in the claims.

DETAILED DESCRIPTION

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

The present application discloses systems for authenticating digital contents that overcome the drawbacks and deficiencies in the conventional art. It is noted that, in some implementations, the present content authentication solution may be performed as a substantially automated process by a substantially automated system. It is noted that, as used in the present application, the terms "automation," "automated", and "automating" refer to systems and processes that do not require the participation of a human user, such as a system administrator. Although, in some implementations, a human system operator or administrator may review the authenticity determinations made by the automated systems described herein, that human involvement is optional. Thus, the methods described in the present application may be performed under the control of hardware processing components of the disclosed automated systems.

Figure 1:
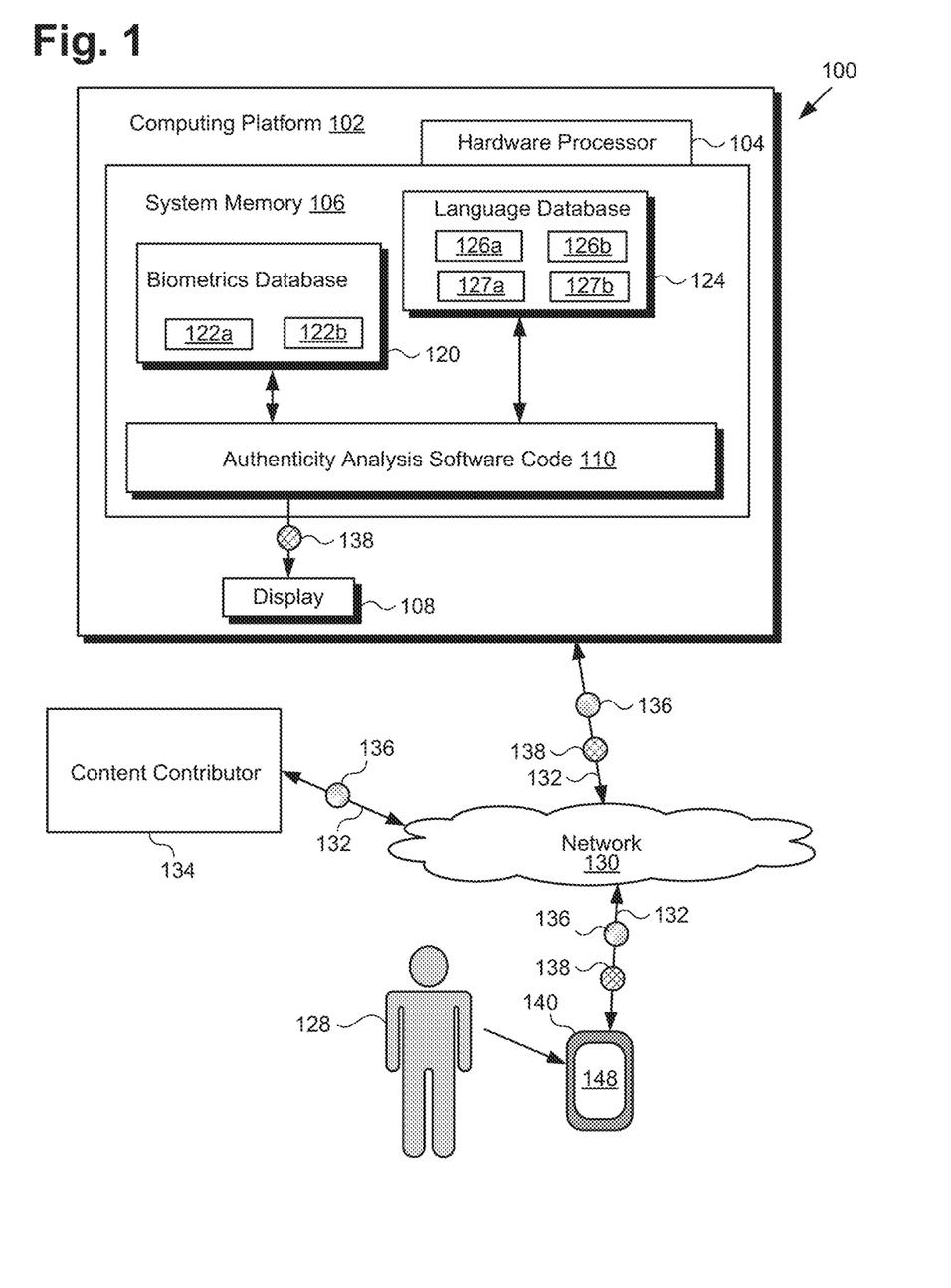
FIG. 1 shows a diagram of an exemplary system for authenticating digital contents, according to one implementation.

FIG. 1 shows a diagram of an exemplary system for authenticating digital contents, according to one implementation. As discussed below, system 100 may be implemented using a computer server accessible over a local area network (LAN) or may be implemented as cloud-based system. As shown in FIG. 1, system 100 includes computing platform 102 having hardware processor 104, system memory 106 implemented as a non-transitory storage device, and display 108. According to the present exemplary implementation, system memory 106 stores biometrics database 120 including biometric profiles 122a and 122b, and language database 124 including linguistic profiles 126a and 126b and scripts 127a and 127b, as well as authenticity analysis software code 110 providing authenticity determination 138 regarding digital content 136.

As also shown in FIG. 1, system 100 is implemented within a use environment including communication network 130 having network communication links 132 and user system 140 including display 148. User 128 interacts with system 100 through use of user system 140. It is noted that communication network 130 and network communication links 132 enable system 100 to receive digital content 136 provided by content contributor 134 or user 128, and to output authenticity determination 138 for rendering on display 148 of user system 140. Alternatively, or in addition, in some implementations authenticity determination 138 may be rendered on display 108 of system 100.

By way of overview, system 100 may be implemented as a quality control (QC) resource of a media entity providing audio-video (AV) content in a linear television (TV) program stream, for example, that includes a high-definition (HD) or ultra-HD (UHD) baseband video signal with embedded audio, captions, time code, and other ancillary metadata, such as ratings and/or parental guidelines. Alternatively, or in addition, the media entity including system 100 as a QC resource may distribute AV content via a radio or satellite radio broadcast.

According to the exemplary implementation shown in FIG. 1, system 100 is configured to receive digital content 136 from content contributor 134 or user system 140, and to determine the authenticity of digital content 136 using authenticity analysis software code 110, executed by hardware processor 104. Content contributor 134 may be another media entity, a professional news gatherer such as an authorized field reporter for the media entity including system 100, or an amateur content contributor providing digital content 136 in the form of a home video or other AV content generated using a personal communication device or other communication system. In some implementations, content contributor 134 may utilize such a communication system to submit digital content 136 to system 100 via communication network 130 and network communication links 132. However, in other implementations, content contributor 134 may utilize the communication system to submit digital content 136 to user system 140 utilized by user 128. In those latter implementations, user 128 may further utilize user system 140 to submit digital content 136 to system 100 for authenticity determination, or may perform the authenticity determination using user system 140, as discussed in greater detail below.

Digital content 136 may take the form of video content without audio, audio content without video, or AV content, such as a movie, episodic content that may include a television show series, a web series and/or a video log, sports content, news content, advertising content, or video gaming content, to name a few examples. Alternatively, in some implementations, digital content 136 may take the form of a digital photograph.

It is noted that although the present application refers to authenticity analysis software code 110, biometrics database 120, and language database 124 as being stored in system memory 106 for conceptual clarity, more generally, system memory 106 may take the form of any computer-readable non-transitory storage medium. The expression "computer-readable non-transitory storage medium," as used in the present application, refers to any medium, excluding a carrier wave or other transitory signal that provides instructions to hardware processor 104 of computing platform 102, or to a hardware processor of user system 140 (hardware processor of user system 140 not shown in FIG. 1). Thus, a computer-readable non-transitory medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory media include, for example, optical discs, RAM, programmable read-only memory (PROM), erasable PROM (EPROM), and FLASH memory.

It is further noted that although FIG. 1 depicts authenticity analysis software code 110, biometrics database 120, and language database 124 as being co-located in system memory 106, that representation is also provided merely as an aid to conceptual clarity. More generally, system 100 may include one or more computing platforms 102, such as computer servers for example, which may be co-located, or may form an interactively linked but distributed system, such as a cloud-based system, for instance.

As a result, hardware processor 104 and system memory 106 may correspond to distributed processor and memory resources within system 100. Thus, it is to be understood that biometrics database 120 and/or language database 124, as well as various features of authenticity analysis software code 110, such as one or more of the features described below by reference to FIG. 3, may be stored and/or executed using the distributed memory and/or processor resources of system 100.

According to the implementation shown by FIG. 1, user 128 may utilize user system 140 to interact with system 100 over communication network 130 to determine the authenticity of digital content 136. In one such implementation, computing platform 102 may correspond to one or more web-based computer servers, accessible over a packet-switched network such as the Internet, for example. Alternatively, computing platform 102 may correspond to one or more computer servers supporting a wide area network (WAN), a LAN, or included in another type of limited distribution or private network.

It is also noted that although FIG. 1 depicts user system 140 as a mobile communication device, such as a smartphone or tablet computer, that representation is merely exemplary as well. More generally, user system 140 may be any suitable system that implements data processing capabilities sufficient to provide a user interface, support connections to communication network 130, and implement the functionality ascribed to user system 140 herein. In other implementations, user system 140 may take the form of a desktop computer, a laptop computer, a game console, or a smart device such as a smart TV, to name a few examples.

With respect to display 148 of user system 140, display 148 may be physically integrated with user system 140 or may be communicatively coupled to but physically separate from user system 140. For example, where user system 140 is implemented as a smartphone, laptop computer, tablet computer, or smart TV, display 148 will typically be integrated with user system 140. By contrast, where user system 140 is implemented as a desktop computer, display 148 may take the form of a monitor separate from device user system 140 in the form of a computer tower. Analogously, display 108 of system 100 may be physically integrated with computing platform 102 of system 100, as shown in FIG. 1, or may be communicatively coupled to but physically separate from computing platform 102. Displays 108 and 148 may be implemented as liquid crystal displays (LCDs), light-emitting diode (LED) displays, organic light-emitting diode (OLED) displays, or any other suitable display screens that perform a physical transformation of signals to light.

Figure 2:
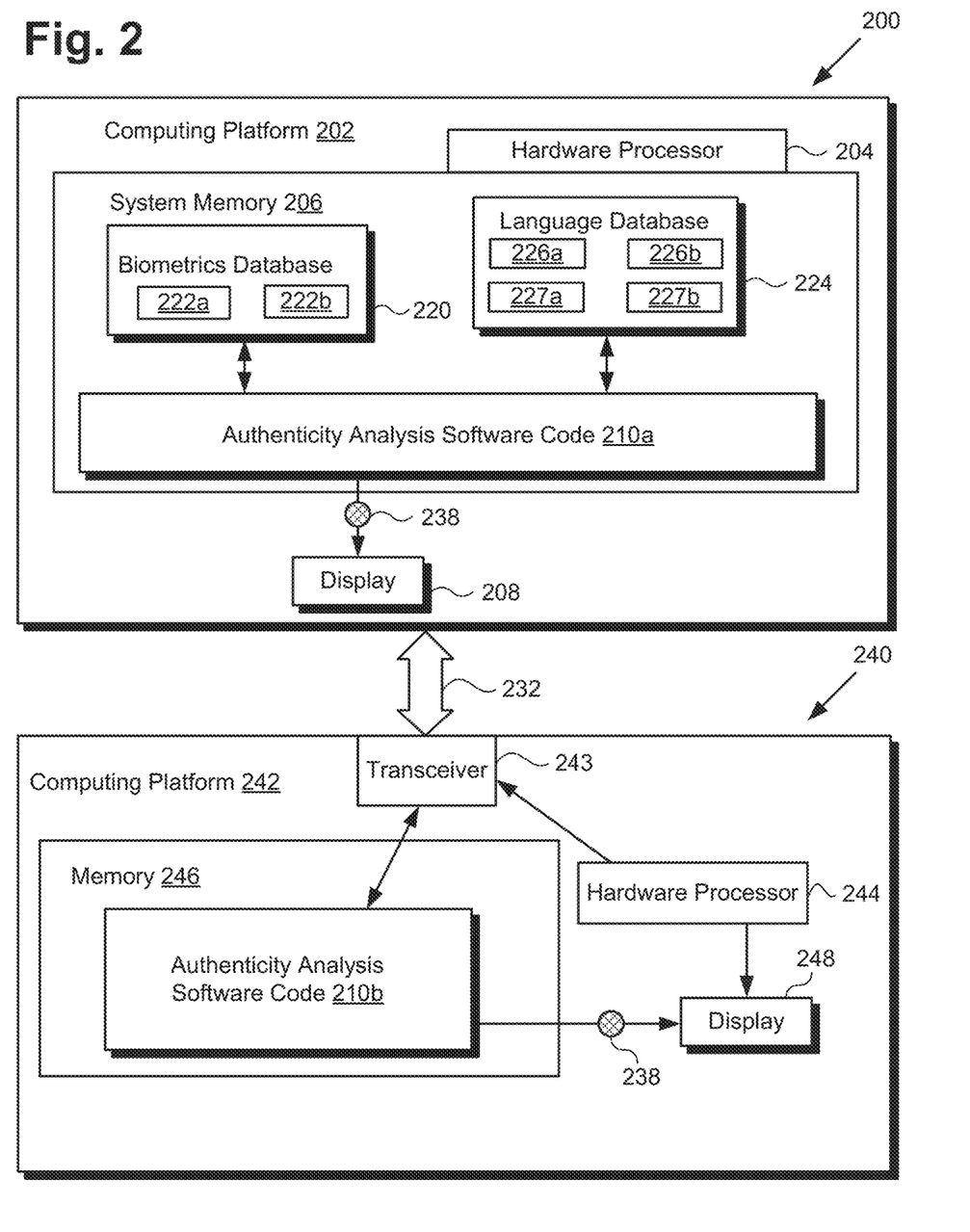
FIG. 2 shows another exemplary implementation of a system for authenticating digital contents.

FIG. 2 shows another exemplary implementation of a system for authenticating digital contents. According to the exemplary implementation shown in FIG. 2, user system 240 is interactively connected to system 200 over network communication link 232. Computing platform 202 of system 200 includes hardware processor 204, and system memory 206 storing biometrics database 220 including biometric profiles 222*a* and 222*b*, and language database 224 including linguistic profiles 226*a* and 226*b* and scripts 227*a* and 227*b*, as well as authenticity analysis software code 210*a* providing authenticity determination 238. In addition, FIG. 2 shows display 208 of system 200.

As shown in FIG. 2, user system 240 includes computing platform 242 having transceiver 243, hardware processor 244, and memory 246 implemented as a non-transitory storage device storing authenticity analysis software code 210*b*. According to the exemplary implementation shown in FIG. 2, authenticity analysis software code 210*b* provides authenticity determination 238 for rendering on display 248 of user system 240. It is noted that authenticity determination 238 corresponds in general to authenticity determination 138, in FIG. 1, and those corresponding features may share any of the characteristics attributed to either feature by the present disclosure.

Network communication link 232, and system 200 including computing platform 202 having hardware processor 204, system memory 206, and display 208 correspond respectively in general to network communication links 132, and system 100 including computing platform 102 having hardware processor 104, system memory 106, and display 108, in FIG. 1. In addition, authenticity analysis software code 210*a*, biometrics database 220, and language database 224 correspond respectively in general to authenticity analysis software code 110, biometrics database 120, and language database 124, in FIG. 1. Thus, biometrics database 220, language database 224, and authenticity analysis software code 210a may share any of the characteristics attributed to respective biometrics database 120, language database 124, and authenticity analysis software code 110 by the present disclosure, and vice versa.

Moreover, biometric profiles 222a and 222b included in biometrics database 220, linguistic profiles 226a and 226b stored in language database 224, and scripts 227a and 227b stored in language database 224 correspond respectively in general to biometric profiles 122a and 122b, linguistic profiles 126a and 126b, and scripts 127a and 127b, in FIG. 1. That is to say, biometric profiles 222a and 222b, linguistic profiles 226a and 226b, and scripts 227a and 227b may share any of the characteristics attributed to respective biometric profiles 122a and 122b, linguistic profiles 126a and 126b, and scripts 127a and 127b by the present disclosure, and vice versa.

User system 240 and display 248, in FIG. 2, correspond in general to user system 140 and display 148, in FIG. 1, and those corresponding features may share any of the characteristics attributed to either corresponding feature by the present disclosure. Thus, like user system 140, user system 240 may take the form of a smart TV, desktop computer, laptop computer, tablet computer, game console, or smartphone, for example. In addition, and although not shown in FIG. 1, user system 140 may include features corresponding to computing platform 242, transceiver 243, hardware processor 244, and memory 246 storing authenticity analysis software code 210b. Moreover, like displays 108 and 148, respective displays 208 and 248 may be implemented as LCDs, LED displays, OLED displays, or any other suitable display screens that perform a physical transformation of signals to light.

Transceiver 243 may be implemented as a wireless communication unit enabling user system 240 to exchange data with computing platform 202 via network communication link 232. For example, transceiver 243 may be implemented as a fourth generation (4G) wireless transceiver, or as a 5G wireless transceiver configured to satisfy the IMT-2020 requirements established by the International Telecommunication Union (ITU). With respect to authenticity analysis software code 210b, and referring to FIG. 1 in combination with FIG. 2, it is noted that in some implementations, authenticity analysis software code 210b may be a thin client application merely usable for submitting digital content 136 to system 100/200, and for rendering authenticity determination 138/238 received from system 100/200.

However, in other implementations, authenticity analysis software code 210b may be a software application including all of the features of authenticity analysis software code 210a, and may be capable of executing all of the same functionality. That is to say, in some implementations, authenticity analysis software code 210b corresponds to authenticity analysis software code 110 in FIG. 1, and may share any of the characteristics attributed to that corresponding feature by the present disclosure.

According to the exemplary implementation shown in FIG. 2, authenticity analysis software code 210b is located in memory 246, and was received by user system 240 via network communication link 232, either from computing platform 202 or an authorized third party source of authenticity analysis software code 210b. In one implementation, network communication link 232 enables transfer of authenticity analysis software code 210b over a packet-switched network, such as the Internet, for example.

Once transferred, for instance by being downloaded over network communication link 232, authenticity analysis software code 210b may be persistently stored in memory 246, and may be executed locally on user system 240 by hardware processor 244. Hardware processor 244 may be the central processing unit (CPU) for user system 240, for example, in which role hardware processor 244 runs the operating system for user system 240 and executes authenticity analysis software code 210b.

It is noted that, as shown in FIG. 1, in some implementations, computing platform 102 of system 100 for authenticating digital contents may take the form of one or more web-based computer servers. However, and as shown in FIG. 2, in other implementations, user system 240 may be configured to provide substantially all of the functionality of system 200. Thus, in some implementations, the computing platform of a system for authenticating digital contents may be provided by computing platform 242 of user system 240. That is to say, in some implementations, computing platform 242 of user system 240 for authenticating digital contents may take the form of a mobile communication device computing platform, such as a smartphone or tablet computer, for example.

Figure 3:
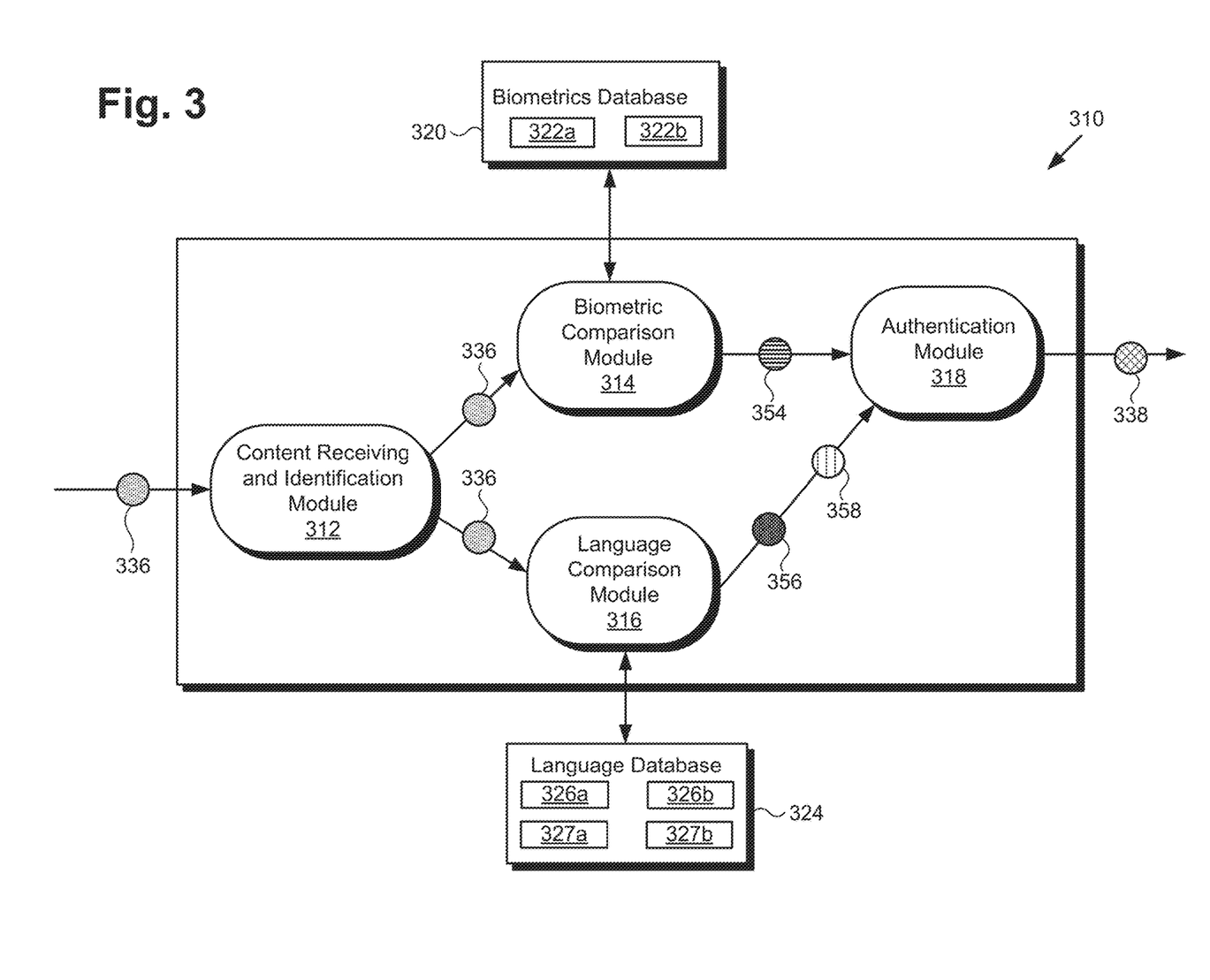
FIG. 3 shows an exemplary diagram of an authenticity analysis software code suitable for execution by a hardware processor of the systems shown in FIGS. 1 and 2.

FIG. 3 shows an exemplary diagram of authenticity analysis software code 310 suitable for execution by hardware processor 104/204 of system 100/200, or by hardware processor 244 of user system 240, according to one implementation. As shown in FIG. 3, authenticity analysis software code 310 may include content receiving and identification module 312, biometric comparison module 314, language comparison module 316, and authentication module 318. In addition, FIG. 3 shows digital content 336 received as an input to authenticity analysis software code 310, biometric comparison 354, linguistic mannerism comparison 356, and monologue or dialogue comparison 358, as well as authenticity determination 338 provided as an output by authenticity analysis software code 310. Also shown in FIG. 3 is biometrics database 320 including biometric profiles 322a and 322b, and language database 324 including linguistic profiles 326a and 326b and scripts 327a and 327b.

Digital content 336 corresponds in general to digital content 136, in FIG. 1, and those corresponding features may share any of the characteristics attributed to either feature by the present disclosure. Authenticity determination 338, biometrics database 320, biometric profiles 322a and 322b, language database 324, linguistic profiles 326a and 326b, and scripts 327a and 327b, in FIG. 3, correspond respectively in general to authenticity determination 138/238, biometrics database 120/220, biometric profiles 122a/222a and 122b/222b, language database 124/224, linguistic profiles 126a/226a and 126b/226b, and scripts 127a/227a and 127b/227b in FIGS. 1 and 2, and may share any of the characteristics attributed to those corresponding features by the present disclosure.

Authenticity analysis software code 310, in FIG. 3, corresponds in general to authenticity analysis software code 110/210a in FIGS. 1 and 2, and, in some implementations, may correspond to authenticity analysis software code 210b, in FIG. 2. In other words, authenticity analysis software code 110/210a and authenticity analysis software code 210b may share any of the characteristics attributed to authenticity analysis software code 310 by the present disclosure, and vice versa. Thus, like authenticity analysis software code 310, authenticity analysis software code 110/210a and authenticity analysis software code 210b may include modules corresponding respectively to content receiving and identification module 312, biometric comparison module 314, language comparison module 316, and authentication module 318.

Figure 4:
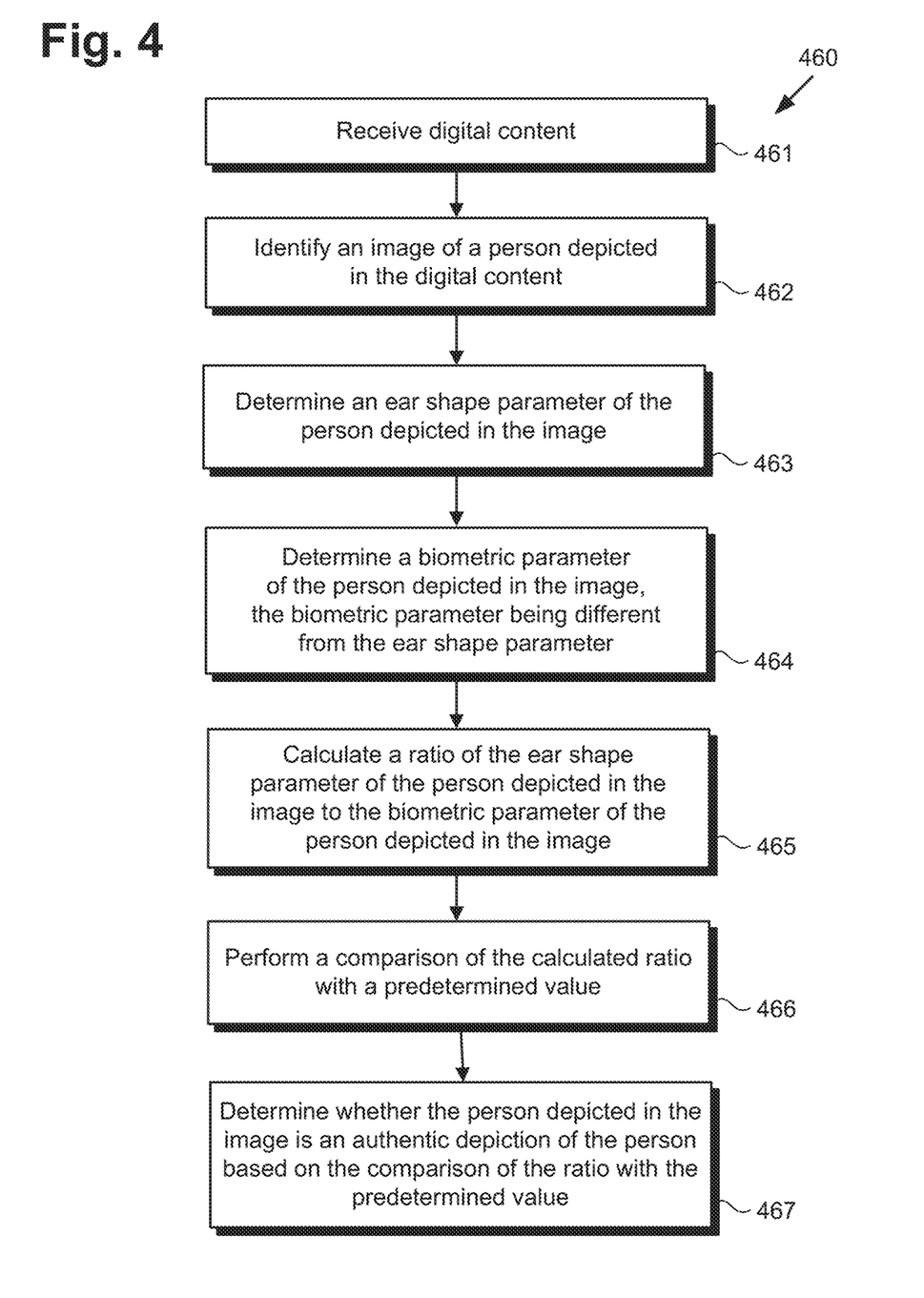
FIG. 4 is a flowchart presenting an exemplary method for use by a system for authenticating digital contents, according to one implementation.
Figure 5:
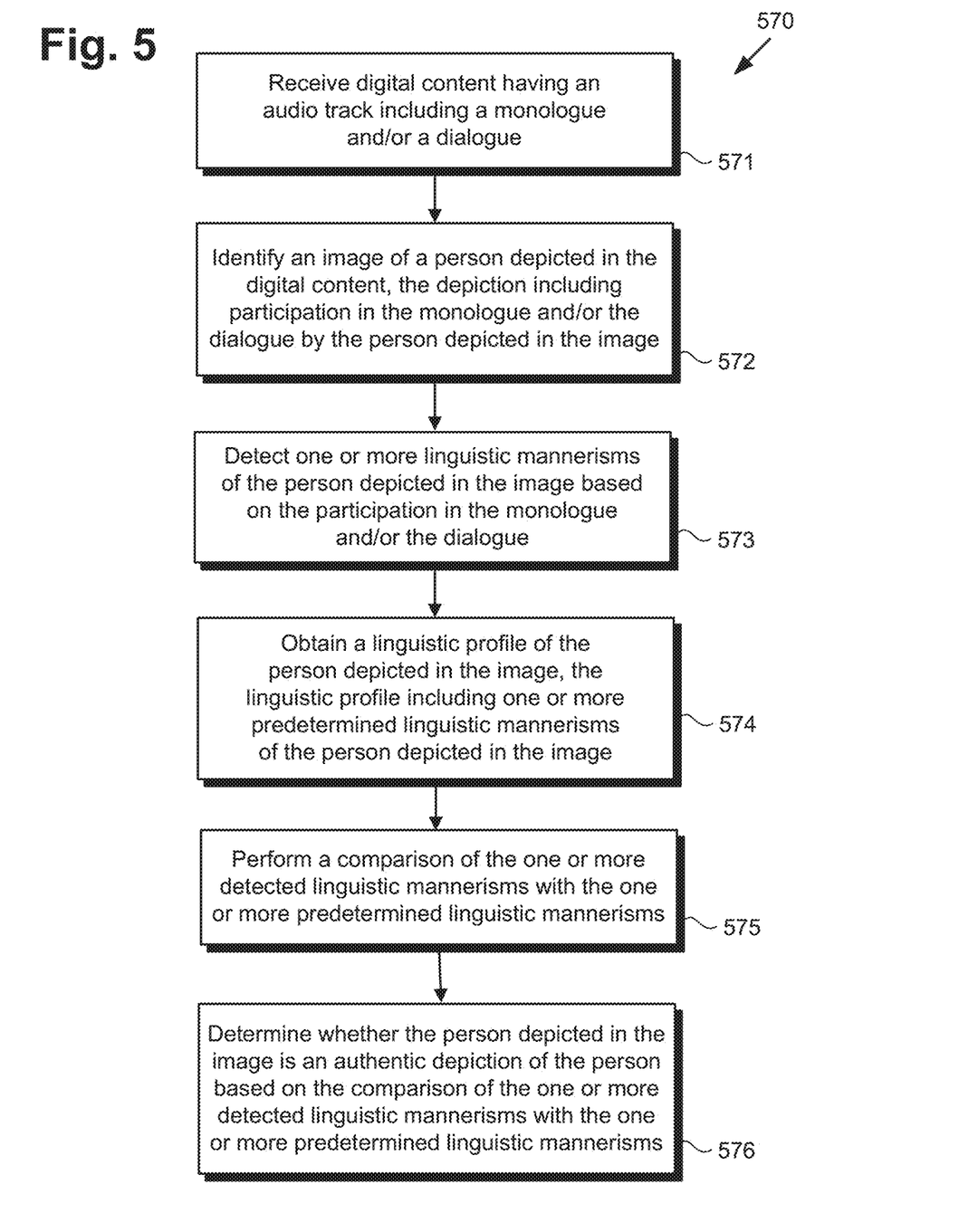
FIG. 5 is a flowchart presenting an exemplary method for use by a system for authenticating digital contents, according to another implementation.
Figure 6:
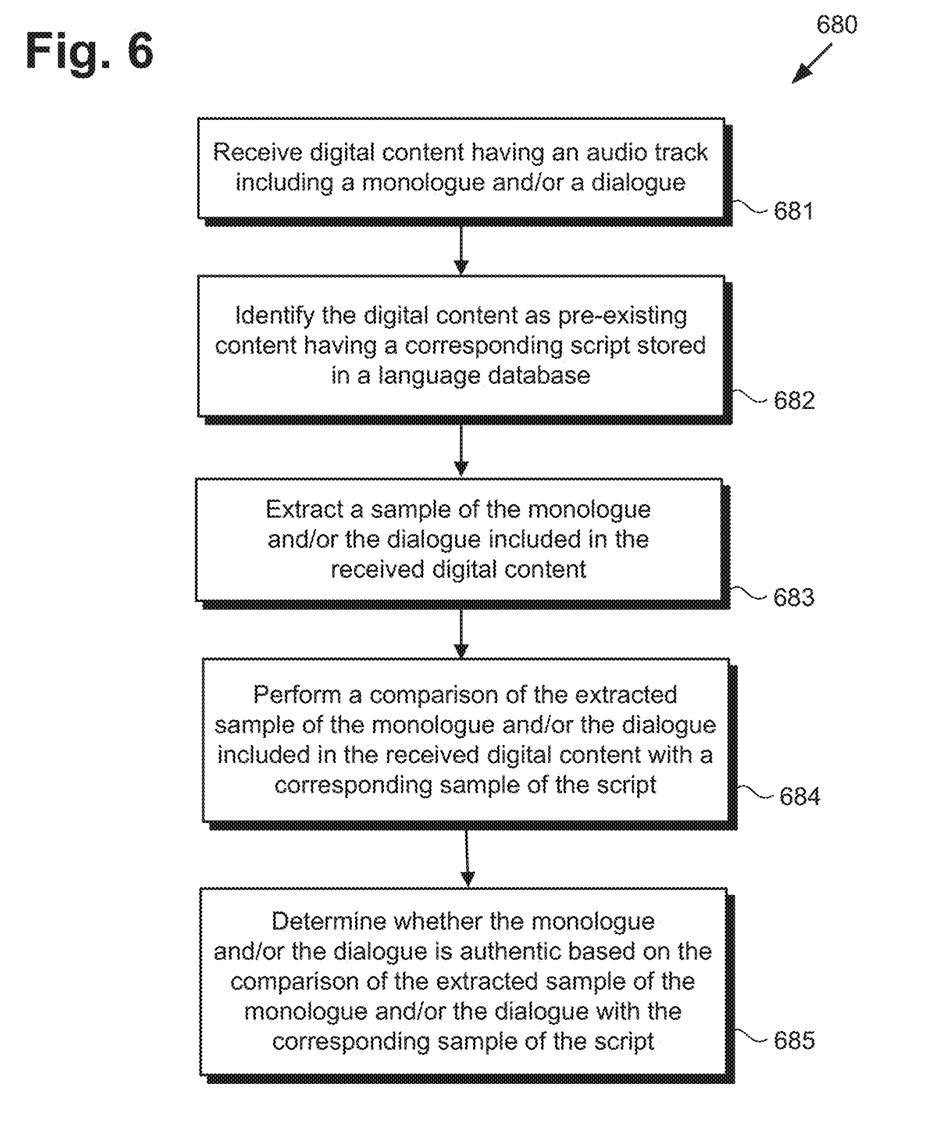
FIG. 6 is a flowchart presenting an exemplary method for use by a system for authenticating digital contents, according to yet another implementation.

The functionality of authenticity analysis software code 110/210a/310 and authenticity analysis software code 210b/310 will be further described by reference to FIGS. 4, 5, and 6 in combination with FIGS. 1, 2, and 3. FIG. 4 shows flowchart 460 presenting an exemplary method for use by a system for authenticating digital contents, according to one implementation, while FIG. 5 shows flowchart 570 presenting an exemplary method for use by a system for authenticating digital contents, according to another implementation. FIG. 6 shows flowchart 680 presenting an exemplary method for use by a system for authenticating digital contents, according to yet another implementation. With respect to the methods outlined in FIGS. 4, 5, and 6, it is noted that certain details and features have been left out of respective flowcharts 460, 570, and 680 in order not to obscure the discussion of the inventive features in the present application.

Referring to FIG. 4 in combination with FIGS. 1, 2, and 3, flowchart 460 begins with receiving digital content 136/336 (action 461). As noted above, in some implementations, digital content 136/336 may take the form of video content without audio, or AV content, such as a movie, episodic content that may include a television show series, a web series and/or a video log, sports content, news content, advertising content, or video gaming content, to name a few examples. Alternatively, in some implementations, digital content 136 may take the form of a digital photograph.

As shown by FIG. 1, in one implementation, digital content 136 may be received by system 100 from content contributor 134 or user system 140, via communication network 130 and network communication links 132. In those implementations, digital content 136/336 may be received by authenticity analysis software code 110/210a/310, executed by hardware processor 104/204 of computing platform 102/202, and using content receiving and identification module 312. However, referring to FIG. 2 in combination with FIG. 1, in another implementation, digital content 136/336 may be received from content contributor 134 by user system 140/240 using transceiver 243. In those implementations, digital content 136/336 may be received by authenticity analysis software code 210b/310, executed by hardware processor 244 of user system 140/240, and using content receiving and identification module 312.

Flowchart 460 continues with identifying an image of a person depicted in digital content 136/336 (action 462). In some implementations, digital content 136/336 may be a digital photograph, video, or AV content including an image of a widely recognizable person, such as a celebrity athlete, actor, or politician, for example. However, more generally, a person depicted in digital content 136/336 and identified in action 462 may be any person having one or more corresponding biometric profiles, e.g., biometric profile 122a/222a/322a and/or biometric profile 122b/222b/322b stored in biometrics database 120/220/320. Such a person may be an actor, reporter, newsreader, or other talent employed by the media entity including system 100/200 as a QC resource, for example.

It is noted that the same person may have multiple biometric profiles stored in biometric database 120/220/320. For example, an actor may have different biometric profiles for different stages of their career, as they age. Alternatively, or in addition, an actor may have a distinct biometric profile for each character they portray, or each movie or other AV feature in which they participate. Moreover, in some implementations, it may be advantageous or desirable to have multiple biometric profiles for a single person, each focused on a particular biometric parameter or parameters. That is to say, for instance, the same person may have a first biometric profile for ear shape parameters over time, a second biometric profile for eye shape parameters over time, a third biometric profile for facial symmetries over time, and so forth.

In implementations in which digital content 136/336 is received by system 100/200 in action 461, identification of a person depicted in the image included in digital content 136/336 may be performed by authenticity analysis software code 110/210a/310, executed by hardware processor 104/204 of computing platform 102/202, and using content receiving and identification module 312. However, in implementations in which digital content 136/336 is received by user system 140/240 in action 461, identification of the person depicted in the image included in digital content 136/336 may be performed by authenticity analysis software code 210b/310, executed by hardware processor 244 of user system 140/240, and using content receiving and identification module 312.

Flowchart 460 continues with determining an ear shape parameter of the person depicted in the image and identified in action 462 (action 463). The ear shape parameter determined in action 463 may be a single parameter, such as a single dimension of an ear of the person depicted in the image, or a combination of ear dimensions, such as a sum of two or more ear dimensions, or a hash value of two or more ear dimensions. Ear dimensions relevant to determination of an ear shape parameter in action 463 may include ear length, i.e., the distance from the top of the ear to the bottom of the ear, ear width in a direction perpendicular to ear length, ear lobe shape, e.g., pointed, round, square, and/or angle of rotation of the ear relative to one or more cranial landmarks of the person depicted in the image. It is noted that ear shape parameters may be particularly useful for authenticating identity because ear shapes can be quite unique and different for different individuals.

In implementations in which digital content 136/336 is received by system 100/200 in action 461, determination of the ear shape parameter of the person depicted in the image identified in action 462 may be performed by authenticity analysis software code 110/210a/310, executed by hardware processor 104/204 of computing platform 102/202, and using biometric comparison module 314. However, in implementations in which digital content 136/336 is received by user system 140/240 in action 461, determination of the ear shape parameter of the person depicted in the image identified in action 462 may be performed by authenticity analysis software code 210b/310, executed by hardware processor 244 of user system 140/240, and using biometric comparison module 314.

Flowchart 460 continues with determining a biometric parameter of the person depicted in the image identified in action 462, the biometric parameter being different from the ear shape parameter described above (action 464). In some implementations, the biometric parameter determined in action 464 may be a single facial parameter, such as a distance separating the eyes (hereinafter "interocular distance") or a mouth shape or eye shape parameter of the person depicted in the image. However, in other implementations, the biometric parameter determined in action 464 may be a combination of such facial parameters, such as a sum of two or more facial parameters, or a hash value of two or more facial parameters.

In implementations in which digital content 136/336 is received by system 100/200 in action 461, determination of the biometric parameter of the person depicted in the image and identified in action 462 may be performed by authenticity analysis software code 110/210a/310, executed by hardware processor 104/204 of computing platform 102/202, and using biometric comparison module 314. However, in implementations in which digital content 136/336 is received by user system 140/240 in action 461, determination of the biometric parameter of the person depicted in the image identified in action 462 may be performed by authenticity analysis software code 210b/310, executed by hardware processor 244 of user system 140/240, and using biometric comparison module 314.

Flowchart 460 continues with calculating a ratio of the ear shape parameter of the person depicted in the image, determined in action 463, to the biometric parameter of the person depicted in the image, determined in action 464 (action 465). The ratio calculated in action 465 may be expressed as a dimensionless, purely numerical ratio, as a ratio including dimensional units, or as a hash value. In implementations in which digital content 136/336 is received by system 100/200 in action 461, calculation of the ratio of the ear shape parameter of the person depicted in the image to the biometric parameter of the person depicted in the image may be performed by authenticity analysis software code 110/210a/310, executed by hardware processor 104/204 of computing platform 102/202, and using biometric comparison module 314. However, in implementations in which digital content 136/336 is received by user system 140/240 in action 461, calculation of the ratio of the ear shape parameter of the person depicted in the image to the biometric parameter of the person depicted in the image may be performed by authenticity analysis software code 210b/310, executed by hardware processor 244 of user system 140/240, and using biometric comparison module 314.

By way of example, biometric comparison module 314 may include multiple feature classifiers implemented using neural networks (NNs), such as an ear classifier as well as other biometric feature classifiers. Those classifiers could be trained with ears and other biometric features and each NN would learn features to discriminate between samples, for example ear length, ear width, ear lobe shape, and the like, in the case of an ear classifier. In order to compare ears, for instance, the feature vectors of each ear sample could be calculated, as well as the distances between those vectors. The more similar one ear sample was to another, the closer would be the distance between their respective feature vectors.

Flowchart 460 continues with performing a comparison of the ratio calculated in action 465 with a predetermined value (action 466). For example, where the person identified as being depicted in the image is an actor, reporter, newsreader, or other talent employed by the media entity including system 100/200 as a QC resource, predetermined values of the ratio calculated in action 465 may be stored for each such individual in biometrics database 120/220/320, for instance as part of one of biometric profiles 122a/222a/322a or 122b/222b/322b.

In implementations in which digital content 136/336 is received by system 100/200 in action 461, comparison of the ratio calculated in action 465 with a predetermined value stored in biometrics database 120/220/320 may be performed by authenticity analysis software code 110/210a/310, executed by hardware processor 104/204 of computing platform 102/202, and using biometric comparison module 314. However, in implementations in which digital content 136/336 is received by user system 140/240 in action 461, comparison of the ratio calculated in action 465 with a predetermined value stored in biometrics database 120/220/320 may be performed by authenticity analysis software code 210b/310, executed by hardware processor 244 of user system 140/240, using biometric comparison module 314. For example, in those latter implementations, user system 140/240 may utilize transceiver 243 and communication network 130 to access biometrics database 120/220/320 stored on computing platform 102/202 of system 100/200. It is noted that action 466 results in biometric comparison 354 being provided as an input to authentication module 318 of authenticity analysis software code 110/210a/310, or authenticity analysis software code 210b/310, by biometric comparison module 314.

The exemplary method outlined by flowchart 460 may conclude with determining whether the person depicted in the image is an authentic depiction of the person based on biometric comparison 354 of the ratio calculated in action 465 with the predetermined value stored in biometrics database 120/220/320 (action 467). For example, where biometric comparison 354 reveals a match between the ratio calculated in action 465 and the predetermined value stored in biometrics database 120/220/320, authenticity determination 138/238/338 identifies the person depicted in the image as an authentic depiction of that person. Moreover, in some implementations, action 467 may include determining that digital content 136/336 is authentic as a result of determining that the person depicted in the image is the authentic depiction of the person based on the comparison of the calculated ratio with the predetermined value.

It is noted that, as defined for the purposes of the present disclosure, the expression "a match" refers to the result of a comparison of values that are substantially the same, or are similar to within a predetermined tolerance. As a specific example, where tolerance of a ten percent (10%) variance is predetermined, "a match" between the ratio calculated in action 465 and the predetermined value stored in biometrics database 120/220/320 may occur whenever the ratio calculated in action 465 is from 90% to 110% of the predetermined value stored in biometrics database 120/220/320.

In implementations in which digital content 136/336 is received by system 100/200 in action 461, action 467 may be performed by authenticity analysis software code 110/210a/310, executed by hardware processor 104/204 of computing platform 102/202, and using authentication module 318 to output authenticity determination 138/238/338. However, in implementations in which digital content 136/336 is received by user system 140/240 in action 461, action 467 may be performed by authenticity analysis software code 210b/310, executed by hardware processor 244 of user system 140/240, and using authentication module 318 to output authenticity determination 138/238/338.

It is noted that, in some implementations, hardware processor 104/204 may execute authenticity analysis software code 110/210a/310, or hardware processor 244 of user system 140/240 may execute authenticity analysis software code 210b/310, to perform actions 461, 462, 463, 464, 465, 466, and 467 in an automated process from which human involvement may be omitted.

Referring now to FIG. 5 in combination with FIGS. 1, 2, and 3, as noted above, FIG. 5 shows flowchart 570 presenting an exemplary method for use by a system for authenticating digital contents, according to another implementation. Flowchart 570 begins with receiving digital content 136/336 having an audio track including a monologue and/or a dialogue (action 571). As also noted above, in some implementations, digital content 136/336 may take the form of AV content, such as a movie, episodic content that may include a television show series, a web series and/or a video log, sports content, news content, advertising content, or video gaming content having an audio track including the monologue and/or the dialogue, to name a few examples.

As shown by FIG. 1, in one implementation, digital content 136 may be received by system 100 from content contributor 134 or user system 140, via communication network 130 and network communication links 132. In those implementations, digital content 136/336 may be received by authenticity analysis software code 110/210a/310, executed by hardware processor 104/204 of computing platform 102/202, and using content receiving and identification module 312. However, referring to FIG. 2 in combination with FIG. 1, in another implementation, digital content 136/336 may be received from content contributor 134 by user system 140/240 using transceiver 243. In those implementations, digital content 136/336 may be received by authenticity analysis software code 210b/310, executed by hardware processor 244 of user system 140/240, and using content receiving and identification module 312.

Flowchart 570 continues with identifying an image of a person depicted in digital content 136/336, where the depiction includes participation in the monologue and/or the dialogue by the person depicted in the image (action 572). In some implementations, digital content 136/336 may be AV content including an image of a widely recognizable person, such as a celebrity athlete, actor, or politician, for example. However, more generally, a person depicted in digital content 136/336 and identified in action 572 may be any person having a corresponding one or more linguistic profiles, e.g., linguistic profile 126a/226a/326a and/or linguistic profile 126b/226b/326b stored in language database 124/224/324. Such a person may be an actor, reporter, newsreader, or other talent employed by the media entity including system 100/200 as a QC resource, for example.

It is noted that in implementations in which digital content 136/336 includes more than one person as a participant but only one person is of interest with respect authenticating that person's identity, the audio track included in digital content 136/336 could be split into different audio signals isolating each participant, using a speaker diarisation algorithm, for example. Once the audio for each person's speech is isolated in its own audio file, the actions outlined by flowchart 570 may be performed on the audio data corresponding to the person of interest, but not for others.

It is further noted that the same person may have multiple linguistic profiles stored in language database 124/224/324. For example, an actor may have different linguistic profiles for different stages of their career, as they age. Alternatively, or in addition, an actor may have a distinct linguistic profile for each role they have assumed, or each movie or other audio performance in which they participate. Moreover, in some implementations, it may be advantageous or desirable to have multiple linguistic profiles for a single person, each focused on a different linguistic mannerism or attribute. That is to say, for instance, the same actor may have a first linguistic profile for speech defects they have had, overcome, or portrayed over time, a second biometric profile for accents they have assumed over time, and so forth.

In implementations in which digital content 136/336 is received by system 100/200 in action 571, identification of a person depicted in the image included in digital content 136/336 may be performed by authenticity analysis software code 110/210a/310, executed by hardware processor 104/204 of computing platform 102/202, and using content receiving and identification module 312. However, in implementations in which digital content 136/336 is received by user system 140/240 in action 571, identification of the person depicted in the image included in digital content 136/336 may be performed by authenticity analysis software code 210b/310, executed by hardware processor 244 of user system 140/240, and using content receiving and identification module 312.

Flowchart 570 continues with detecting at least one linguistic mannerism of the person depicted in the image identified in action 572 based on the participation in the monologue and/or the dialogue (action 573). The linguistic mannerism or mannerisms detected in action 573 may include one or more of a speech defect, speech affectation, speech cadence, regional accent, or regional dialect of the person depicted in the image, to name a few examples. In implementations in which digital content 136/336 is received by system 100/200 in action 571, detection of the one or more linguistic mannerisms of the person depicted in the image identified in action 572 may be performed by authenticity analysis software code 110/210a/310, executed by hardware processor 104/204 of computing platform 102/202, and using language comparison module 316. However, in implementations in which digital content 136/336 is received by user system 140/240 in action 571, detection of the one or more linguistic mannerisms of the person depicted in the image identified in action 572 may be performed by authenticity analysis software code 210b/310, executed by hardware processor 244 of user system 140/240, and using language comparison module 316.

Flowchart 570 continues with obtaining one of linguistic profiles 126a/226a/326a or 126b/226b/326b of the person depicted in the image and identified in action 572, where the linguistic profile includes one or more predetermined linguistic mannerisms of the person depicted in the image (action 574). In implementations in which digital content 136/336 is received by system 100/200 in action 571, one of linguistic profiles 126a/226a/326a or 126b/226b/326b may be obtained from language database 124/224/324 by authenticity analysis software code 110/210a/310, executed by hardware processor 104/204 of computing platform 102/202, and using language comparison module 316.

However, in implementations in which digital content 136/336 is received by user system 140/240 in action 571, one of linguistic profiles 126a/226a/326a or 126b/226b/326b may be obtained from language database 124/224/324 by authenticity analysis software code 210b/310, executed by hardware processor 244 of user system 140/240, using language comparison module 316. For example, in those latter implementations, user system 140/240 may utilize transceiver 243 and communication network 130 to access language database 124/224/324 stored on computing platform 102/202 of system 100/200, to obtain one of linguistic profiles 126a/226a/326a or 126b/226b/326b.

Flowchart 570 continues with performing a comparison of the one or more linguistic mannerisms detected in action 573 with the one or more predetermined linguistic mannerisms included in one of linguistic profiles 126a/226a/326a or 126b/226b/326b (action 575). For example, where the person identified as being depicted in the image is an actor, reporter, newsreader, or other talent employed by the media entity including system 100/200 as a QC resource, a linguistic profile including one or more linguistic mannerisms for each such individual may be stored in language database 124/224/324, for instance as part of one of linguistic profiles 126a/226a/326a or 126b/226b/326b. Action 575 may be performed by translating the audio using a speech-to-text algorithm and identifying recurrent words from the person compared to other persons. A metric that could be used in action 575 is term frequency-inverse document frequency (TF-IDF) as known in the art.

In implementations in which digital content 136/336 is received by system 100/200 in action 571, comparison of the one or more linguistic mannerisms detected in action 573 with the one or more predetermined linguistic mannerisms included in one of linguistic profiles 126a/226a/326a or 126b/226b/326b may be performed by authenticity analysis software code 110/210a/310, executed by hardware processor 104/204 of computing platform 102/202, and using language comparison module 316. However, in implementations in which digital content 136/336 is received by user system 140/240 in action 571, comparison of one or more linguistic mannerisms detected in action 573 with the one or more predetermined linguistic mannerisms included in one of linguistic profiles 126a/226a/326a or 126b/226b/326b may be performed by authenticity analysis software code 210b/310, executed by hardware processor 244 of user system 140/240, using language comparison module 316. It is noted that action 575 results in linguistic mannerism comparison 356 being provided as an input to authentication module 318 of authenticity analysis software code 110/210a/310, or authenticity analysis software code 210b/310, by language comparison module 316.

In implementations in which the person whose identity is being authenticated is an actor or other type of performer, it may be advantageous or desirable to distinguish predetermined linguistic mannerisms of that person while "in character" from predetermined linguistic mannerisms displayed when they are speaking as their genuine selves. For example, such a distinction would facilitate identification of deepfake digital content in which a performer purportedly speaking as their genuine self exhibits linguistic mannerisms of a character or role they have assumed in the past. Such a distinction would also facilitate identification of deepfake digital content in which the deepfake generator is trained based on interviews with the performer as their genuine selves, but the deepfake depicts the character as though performing a role.

The exemplary method outlined by flowchart 570 may conclude with determining whether the person depicted in the image is an authentic depiction of the person based on linguistic mannerism comparison 356 of the of the one or more linguistic mannerisms detected in action 573 with the one or more predetermined linguistic mannerisms included in one of linguistic profiles 126a/226a/326a or 126b/226b/326b (action 576). For example, where linguistic mannerism comparison 356 reveals a match between the of one or more linguistic mannerisms detected in action 573 and the one or more predetermined linguistic mannerisms included in one of linguistic profiles 126a/226a/326a or 126b/226b/326b to within a predetermined tolerance, authenticity determination 138/238/338 identifies the person depicted in the image as an authentic depiction of that person. Moreover, in some implementations, action 576 may include determining that digital content 136/336 is authentic when the person depicted in the image matches the authentic depiction of the person based on the comparison of the one or more detected linguistic mannerisms with the one or more predetermined linguistic mannerisms.

In implementations in which digital content 136/336 is received by system 100/200 in action 571, action 576 may be performed by authenticity analysis software code 110/210a/310, executed by hardware processor 104/204 of computing platform 102/202, and using authentication module 318 to output authenticity determination 138/238/338. However, in implementations in which digital content 136/336 is received by user system 140/240 in action 571, action 576 may be performed by authenticity analysis software code 210b/310, executed by hardware processor 244 of user system 140/240, and using authentication module 318 to output authenticity determination 138/238/338.

It is noted that, in some implementations, hardware processor 104/204 may execute authenticity analysis software code 110/210a/310, or hardware processor 244 of user system 140/240 may execute authenticity analysis software code 210b/310, to perform actions 571, 572, 573, 574, 575, and 576 in an automated process from which human involvement may be omitted.

Referring now to FIG. 6 in combination with FIGS. 1, 2, and 3, as noted above, FIG. 6 shows flowchart 680 presenting an exemplary method for use by a system for authenticating digital contents, according to yet another implementation. Flowchart 680 begins with receiving digital content 136/336 having an audio track including a monologue and/or a dialogue (action 681). As also noted above, in some implementations, digital content 136/336 may take the form of audio content without video, or AV content, such as a movie, episodic content that may include a television show series, a web series and/or a video log, sports content, news content, advertising content, or video gaming content having an audio track including the monologue and/or the dialogue, to name a few examples.

As shown by FIG. 1, in one implementation, digital content 136 may be received by system 100 from content contributor 134 or user system 140, via communication network 130 and network communication links 132. In those implementations, digital content 136/336 may be received by authenticity analysis software code 110/210a/310, executed by hardware processor 104/204 of computing platform 102/202, and using content receiving and identification module 312. However, referring to FIG. 2 in combination with FIG. 1, in another implementation, digital content 136/336 may be received from content contributor 134 by user system 140/240 using transceiver 243. In those implementations, digital content 136/336 may be received by authenticity analysis software code 210b/310, executed by hardware processor 244 of user system 140/240, and using content receiving and identification module 312.

Flowchart 680 continues with identifying digital content 136/336 as pre-existing content having a corresponding script stored in language database 124/224/324 (action 682). In some implementations, digital content 136/336 may be AV content in the form of a previously produced movie, television episode, newscast, sportscast, interview, advertisement, or video game, for example. However, more generally, digital content 136/336 identified as pre-exiting content in action 682 may be any digital content including the monologue and/or the dialogue for which a corresponding script, e.g., script 127a/227a/327a or 127b/227b/327b, is stored in language database 124/224/324.

In implementations in which digital content 136/336 is received by system 100/200 in action 681, identification of digital content 136/336 as pre-existing content having a corresponding script stored in language database 124/224/324 may be performed by authenticity analysis software code 110/210a/310, executed by hardware processor 104/204 of computing platform 102/202, and using content receiving and identification module 312. However, in implementations in which digital content 136/336 is received by user system 140/240 in action 681, identification of digital content 136/336 as pre-existing content having a corresponding script stored in language database 124/224/324 may be performed by authenticity analysis software code 210b/310, executed by hardware processor 244 of user system 140/240, and using content receiving and identification module 312.

Flowchart 680 continues with extracting a sample of the monologue and/or the dialogue included in digital content 136/336 (action 683). Depending on the particular use case, action 683 may include sampling the entirety of the monologue and/or the dialogue included in digital content 136/336, or less than the entirety of that monologue and/or the dialogue. For example, in use cases in which less than the entirety of the monologue and/or the dialogue is sampled, a single sample, or multiple samples may be extracted from digital content 136/336. When multiple samples are extracted, those samples may be extracted at random intervals from within digital content 136/336, or at a predetermined location or at predetermined intervals, such as timecode locations or intervals, or frame numbers or intervals.

In implementations in which digital content 136/336 is received by system 100/200 in action 681, extraction of one or more monologue and/or dialogue sample(s) from digital content 136/336 may be performed by authenticity analysis software code 110/210a/310, executed by hardware processor 104/204 of computing platform 102/202, and using language comparison module 316. However, in implementations in which digital content 136/336 is received by user system 140/240 in action 681, extraction of one or more monologue and/or dialogue sample(s) from digital content 136/336 may be performed by authenticity analysis software code 210b/310, executed by hardware processor 244 of user system 140/240, and using language comparison module 316.

Flowchart 680 continues with performing a comparison of the monologue and/or the dialogue sample extracted in action 683 with a corresponding sample from one of scripts 127a/227a/327a or 127b/227b/327b (action 684). For example, where digital content 136/336 is content produced by or owned by a media entity using system 100/200 as a QC resource, a script including all monologues and/or dialogues and/or closed captioning (CC) files included in each item of digital content 136/336 produced or owned by the media entity may be stored in language database 124/224/324.

Action 684 may be performed by translating the audio using a speech-to-text algorithm and comparing the translation with the equivalent portion of one of scripts 127a/227a/327a or 127b/227b/327b. It is noted that action 684 may include aligning the speech-to-text translation with the script to identify the equivalent portion of the script.

In implementations in which digital content 136/336 is received by system 100/200 in action 681, comparison of the monologue and/or the dialogue sample extracted in action 683 with a corresponding sample of one of scripts 127a/227a/327a or 127b/227b/327b may be performed by authenticity analysis software code 110/210a/310, executed by hardware processor 104/204 of computing platform 102/202, and using language comparison module 316. However, in implementations in which digital content 136/336 is received by user system 140/240 in action 681, comparison of the monologue and/or the dialogue sample extracted in action 683 with a corresponding sample of one of scripts 127a/227a/327a or 127b/227b/327b may be performed by authenticity analysis software code 210b/310, executed by hardware processor 244 of user system 140/240, using language comparison module 316. For example, in those latter implementations, user system 140/240 may utilize transceiver 243 and communication network 130 to access language database 124/224/324 stored on computing platform 102/202 of system 100/200, to obtain one of, or a sample of one of scripts 127a/227a/327a or 127b/227b/327b. It is noted that action 684 results in monologue and/or dialogue comparison 358 being provided as an input to authentication module 318 of authenticity analysis software code 110/210a/310, or authenticity analysis software code 210b/310, by language comparison module 316.

The exemplary method outlined by flowchart 680 may conclude with determining whether the monologue and/or the dialogue included in digital content 136/336 is authentic based on monologue and/or dialogue comparison 358 of the sample of monologue and/or the dialogue extracted in action 683 with the corresponding sample of one of scripts 127a/227a/327a or 127b/227b/327b (action 685). For example, where monologue and/or dialogue comparison 358 reveals a match between the sample of the monologue and/or the dialogue extracted in action 683 and the corresponding sample of one of scripts 127a/227a/327a or 127b/227b/327b to within a predetermined tolerance, authenticity determination 138/238/338 identifies the monologue and/or the dialogue included in digital content 136/336 as authentic. Moreover, in some implementations, action 685 may include determining that digital content 136/336 is authentic based on the comparison of the extracted monologue and/or dialogue sample with the corresponding sample of one of scripts 127a/227a/327a or 127b/227b/327b, where such a corresponding sample may include monologue and/or dialogue and/or the contents of a CC file.

In implementations in which digital content 136/336 is received by system 100/200 in action 681, action 685 may be performed by authenticity analysis software code 110/210a/310, executed by hardware processor 104/204 of computing platform 102/202, and using authentication module 318 to output authenticity determination 138/238/338. However, in implementations in which digital content 136/336 is received by user system 140/240 in action 681, action 685 may be performed by authenticity analysis software code 210b/310, executed by hardware processor 244 of user system 140/240, and using authentication module 318 to output authenticity determination 138/238/338.

It is noted that, in some implementations, hardware processor 104/204 may execute authenticity analysis software code 110/210a/310, or hardware processor 244 of user system 140/240 may execute authenticity analysis software code 210b/310, to perform actions 681, 682, 683, 684, and 685 in an automated process from which human involvement may be omitted. It is also noted that more than one of the methods outlined by FIGS. 4, 5, and 6 may be performed in combination to authenticate digital content. In other words, in some implementations, the methods outlined by flowcharts 460 and 570 may be performed together to determine the authenticity of digital content, while in other implementations, the methods outlined by flowcharts 460 and 680 may be performed together as part of an authenticity assessment. In other implementations, the methods outlined by flowcharts 570 and 680 may be performed together. In yet other implementations, the methods outlined by flowcharts 460, 570, and 680 may be performed together to determine the authenticity of digital content.

Thus, the present application discloses systems for authenticating digital contents that overcome the drawbacks and deficiencies in the conventional art. From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A system for authenticating digital contents, the system comprising:
a computing platform including a hardware processor and a system memory;
a software code stored in the system memory;
the hardware processor configured to execute the software code to:
receive a digital content;
identify a person depicted in an image in the digital content;
determine an ear shape parameter of the person depicted in the image;
determine a biometric parameter of the person depicted in the image, the biometric parameter being different from the ear shape parameter;
calculate a ratio of the ear shape parameter of the person depicted in the image to the biometric parameter of the person depicted in the image;
perform a comparison of the calculated ratio with a predetermined value; and
determine whether the person depicted in the image is an authentic depiction of the person based on the comparison of the calculated ratio with the predetermined value.

2. The system of claim 1, wherein the hardware processor is further configured to execute the software code to:
determine the digital content to be authentic as a result of determining that the person depicted in the image is the authentic depiction of the person based on the comparison of the calculated ratio with the predetermined value.

3. The system of claim 1, wherein the biometric parameter of the person depicted in the image comprises an interocular distance of eyes of the person depicted in the image.

4. The system of claim 1, wherein the biometric parameter of the person depicted in the image comprises at least one of an eye shape parameter or a mouth shape parameter of the person depicted in the image.

5. The system of claim 1, wherein the digital content comprises at least one of sports content, television programming content, movie content, advertising content, or video game content.

6. The system of claim 1, wherein the computing platform comprises at least one web-based computer server.

7. The system of claim 1, wherein the computing platform comprises a mobile communication device.

8. The system of claim 1, wherein the ear shape parameter of the person depicted in the image comprises a single dimension of an ear of the person depicted in the image.

9. The system of claim 1, wherein the ear shape parameter of the person depicted in the image comprises a combination of ear dimensions of an ear of the person depicted in the image.

10. The system of claim 1, wherein the biometric parameter of the person depicted in the image comprises a combination of facial parameters of the person depicted in the image.

11. A method of authenticating digital contents, the method comprising:
receiving a digital content;
identifying a person depicted in an image in the digital content;
determining an ear shape parameter of the person depicted in the image;
determining a biometric parameter of the person depicted in the image, the biometric parameter being different from the ear shape parameter;
calculating a ratio of the ear shape parameter of the person depicted in the image to the biometric parameter of the person depicted in the image;
performing a comparison of the calculated ratio with a predetermined value; and
determining whether the person depicted in the image is an authentic depiction of the person based on the comparison of the calculated ratio with the predetermined value.

12. The method of claim 11, further comprising:
determining the digital content to be authentic as a result of determining that the person depicted in the image is the authentic depiction of the person based on the comparison of the calculated ratio with the predetermined value.

13. The method of claim 11, wherein the biometric parameter of the person depicted in the image comprises an interocular distance of eyes of the person depicted in the image.

14. The method of claim 11, wherein the biometric parameter of the person depicted in the image comprises at least one of an eye shape parameter or a mouth shape parameter of the person depicted in the image.

15. The method of claim 11, wherein the digital content comprises at least one of sports content, television programming content, movie content, advertising content, or video game content.

16. The method of claim 11, wherein the method is performed by at least one web-based computer server.

17. The method of claim 11, herein the method is performed by a mobile communication device.

18. The method of claim 11, wherein the ear shape parameter of the person depicted in the image comprises a single dimension of an ear of the person depicted in the image.

19. The method of claim 11, wherein the ear shape parameter of the person depicted in the image comprises a combination of ear dimensions of an ear of the person depicted in the image.

20. The method of claim 11, wherein the biometric parameter of the person depicted in the image comprises a combination of facial parameters of the person depicted in the image.

* * * * *